United States Patent [19]

Parlour et al.

[11] Patent Number: 5,574,634
[45] Date of Patent: Nov. 12, 1996

[54] REGULATOR FOR PUMPED VOLTAGE GENERATOR

[75] Inventors: David B. Parlour, Pittsburgh, Pa.; Roger D. Carpenter, Cupertino, Calif.

[73] Assignee: Xilinx, Inc., San Jose, Calif.

[21] Appl. No.: 176,304

[22] Filed: Jan. 3, 1994

Related U.S. Application Data

[63] Continuation of Ser. No. 784,843, Oct. 30, 1991, abandoned.

[51] Int. Cl.⁶ .................................................. H02M 3/18
[52] U.S. Cl. .................................... 363/59; 363/60
[58] Field of Search .................. 363/59, 60; 323/313; 327/262; 326/38, 41

[56] References Cited

U.S. PATENT DOCUMENTS

| | | | |
|---|---|---|---|
| 4,050,004 | 9/1977 | Greatbatch | 363/59 |
| 4,134,057 | 1/1979 | Portmann | 320/61 |
| 4,325,113 | 4/1982 | Tomlie, Jr. | 363/60 |
| 4,404,624 | 9/1983 | Yamazaki | 363/59 |
| 4,583,157 | 4/1986 | Kirsch et al. | 363/60 |
| 4,769,753 | 9/1988 | Knudson et al. | 363/60 |
| 4,820,936 | 4/1989 | Veendrick et al. | 307/296 |
| 4,961,007 | 10/1990 | Kumanoya et al. | 307/296.2 |
| 4,985,650 | 1/1991 | Schuett et al. | 307/465 |
| 5,006,974 | 4/1991 | Kazrounian et al. | 363/60 |
| 5,015,885 | 5/1991 | El Gamal et al. | 307/465 |
| 5,051,882 | 9/1991 | Grimm et al. | 363/60 |
| 5,081,371 | 1/1992 | Wong | 307/296.2 |
| 5,083,083 | 1/1992 | El-Ayat et al. | 324/158 |
| 5,093,586 | 3/1992 | Asari | 307/296.1 |
| 5,132,895 | 7/1992 | Kase | 363/60 |

*Primary Examiner*—Peter S. Wong
*Assistant Examiner*—Adolf Berhane
*Attorney, Agent, or Firm*—Jeanette S. Harms; Edel M. Young

[57] ABSTRACT

According to the invention, a regulated voltage pump is provided which uses a chain of diodes between each of which is attached one plate of a capacitor for which the other plate is driven by a clock signal. The regulated voltage pump of the present invention uses feedback from the output signal to determine how many capacitors to pump. A comparator compares a signal related to the pumped output signal to a reference voltage (which may be the power supply voltage) and controls how many intermediate pumping capacitors receive a switching clock signal. Thus a regulated pumped voltage is provided.

9 Claims, 8 Drawing Sheets

Block Diagram of voltage tripler with regulation

FIG. 1 Application of pumped voltage generator to SRAM-programmable gate arrays
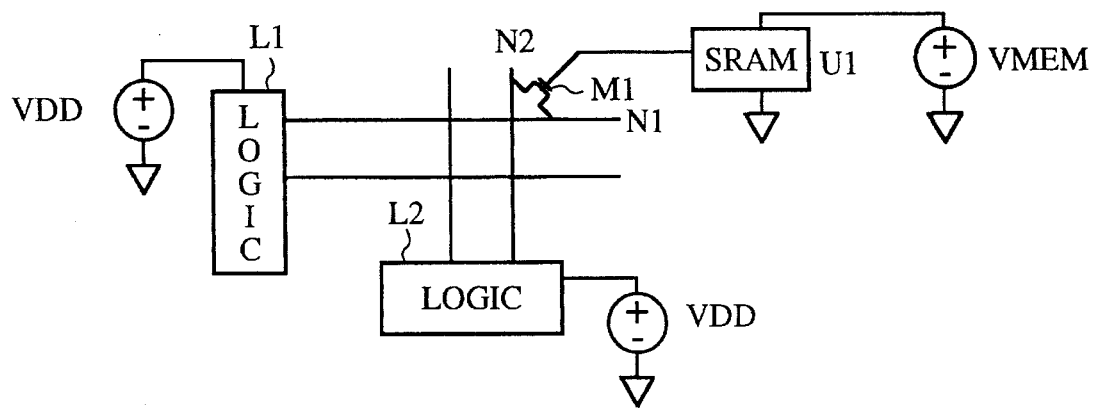
FIG. 2 Controlling isolation transistor in antifuse-programmable gate arrays.
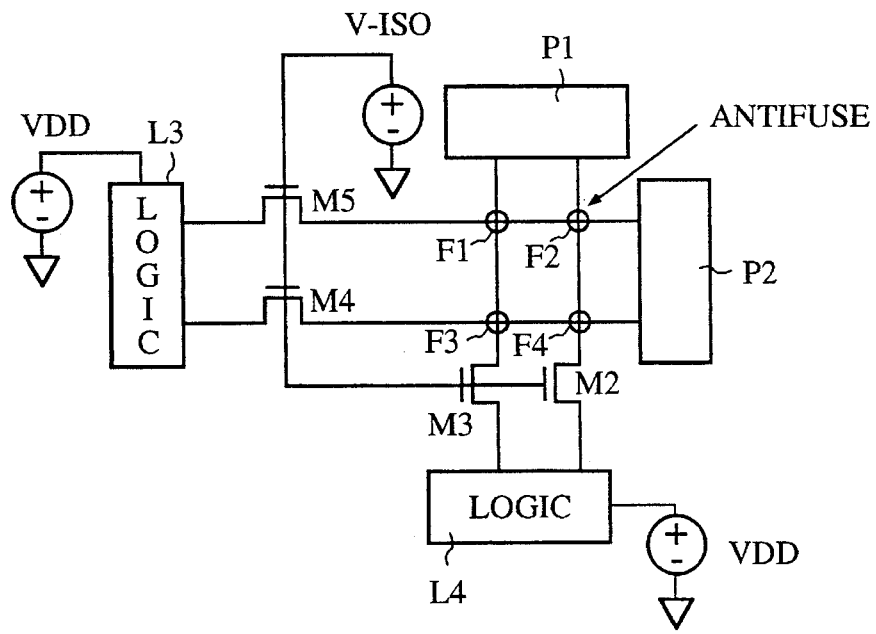

FIG. 5  Block Diagram of voltage tripler with regulation

REGULATOR FOR PUMPED VOLTAGE GENERATOR

This application is a continuation of application Ser. No. 07/784,843, filed Oct. 30, 1991 now abandoned.

FIELD OF THE INVENTION

The invention relates to integrated circuits, and to power supplies for driving portions of an integrated circuit structure.

BACKGROUND OF THE INVENTION

There are a number of applications in integrated circuits where an on-chip voltage which exceeds the value supplied by an external power supply is useful. Two such applications, shown in FIGS. 1 and 2 respectively, are (1) controlling pass transistors in field programmable gate array structures, and (2) controlling isolation transistors in antifuse-programmable gate array structures.

FIG. 1 shows a circuit in which N-channel pass transistor M1 interconnects two logic units L1 and L2, the gate of pass transistor M1 being controlled by SRAM memory cell U1, which is in turn powered by memory cell power supply Vmem. Transistor M1 is used to form a user programmable connection between interconnect lines (nets) N1 and N2. If the power supply voltage to memory cell U1 is the same as the power supply voltage for the logic units L1 and L2, transistor M1 will not pass the full voltage level between the two nets N1 and N2. However, raising the logic high voltage to the gate of transistor M1 by an amount greater than the threshold voltage drop of transistor M1 will avoid the logic-high threshold drop and consequent loss of voltage swing. FIG. 2 shows an antifuse circuit which can benefit from a pumped voltage supply. Transistors M2 through M5 control transmission of logic signals between logic units L3 and L4. By applying a low isolation voltage V-ISO to gates of transistors M2 through M5, these transistors are held off while programming voltage control units P1 and P2 program selected ones of antifuses F1 through F4. During operation, transistors M2 through M5 are turned on through a high signal provided by V-ISO. The interconnection of logic units L3 and L4 is determined by the states of antifuses F1 through F4. Use of a high V-ISO voltage assures high performance by providing full voltage swings (no threshold drop) across transistors M2 through M5.

Further, maintaining the full voltage swing simplifies the receiving logic. For example, the logic circuit can be a typical 5-volt CMOS circuit using 5-volt logic signals. Further, the reduced resistance of transistor M1 in its on-state greatly increases the speed of passing logic signals between logic units L1 and L2. Thus, certain transistors in a circuit such as shown in FIGS. 1 and 2 can benefit from a high voltage at their control terminals.

In order to minimize on-resistance, the on-state voltage applied to gates of transistors such as M1 through M5 should be as high as possible without exceeding the breakdown voltage of the transistors. (Breakdown may consist of current flowing between the drain and substrate in the reverse direction, or less likely, through the insulating oxide between gate and channel, and may permanently change device characteristics, which causes unreliable performance.) A memory cell which is powered at a higher voltage than the power supply voltage can in turn supply a higher gate voltage to transistors such as M1 through M5.

Two common prior art voltage generators using a pumping technique, the voltage doubler and the voltage tripler, are shown in FIGS. 3 and 4, respectively. The names voltage doubler and voltage tripler are only roughly descriptive, and apply to the situation in which the diode drop is small with respect to the supply voltage (not always the case).

In FIG. 3, a steady state Vdd voltage is applied to the anode of diode D31 and generates a voltage at the cathode of diode D31 of at least Vdd minus VD31, where VD31 is the diode drop of diode D31. A square wave clock signal VCLK, which alternates between VDD and ground, is applied to plate C31b of capacitor C31. This varying signal on plate C31b drives current to or from plate C31a. However, when voltage on capacitor plate C31b is low, diode D31 allows current to flow from Vdd to plate C31a and prevents the voltage on plate C31a from going below Vdd–VD31. Likewise, if the voltage on plate C31a rises more than one diode drop above the output voltage VLOAD, current flows through diode D32 to node N31. Thus the voltage level on capacitor plate C31a varies between VDD − VD31 and 2Vdd–VD31, and maintains the voltage VLOAD on node N31 at approximately 2Vdd–VD31–VD32.

Similarly, FIG. 4 shows a voltage tripler in which three diodes D41, D42, and D43 are placed in series as shown, and capacitors C41 and C42 apply clock signals at intermediate points N41 and N42 between successive diodes. Importantly, inverter I41 inverts the polarity of the VCLK signal so that the signal applied to capacitor C42 is out of phase with the signal applied to capacitor C41. As above, the voltage on node N41 varies between Vdd–VD41 and 2Vdd–VD41. Diode D42 becomes conductive if the voltage on node N42 goes below this varying signal by more than VD42, the diode drop of diode D42. Therefore, the voltage on node N42 tends to rise to 2Vdd–VD42. When the voltage on VCLK goes high, current is driven from plate C41a of capacitor C41 through diode D42 and onto plate C42a of capacitor C42, which is being pulled to a low voltage by the low signal from inverter I41. Then as VCLK moves to a low (ground) voltage, the high voltage output from inverter I41 produces a corresponding high voltage on capacitor plate C42a, which in turn drives current through diode D43. Thus the voltage level of between Vdd–VD41 and 2Vdd–VD41 on node N41 results in a voltage level between approximately 2Vdd–VD41–VD42 and 3Vdd–VD41–VD42 on node N42, and a final load voltage of approximately 3Vdd–VD41–VD42–VD43. A load capacitor can smooth this output signal.

Practically, in a 5-volt system, the voltage tripler circuit of FIG. 4 typically produces an output voltage somewhat above twice the supply voltage, and the circuit of FIG. 3 produces a voltage somewhat less than twice the supply voltage. In a simulation of a pumped system using a 5-volt power supply with NMOS diodes having a threshold voltage of 0.55 volts, and a body factor of 0.33 root-volts (body factor relates to the oxide thickness and doping, and determines the threshold at varying substrate voltages), the pumped voltages were as follows:

1-stage pump (doubler) 7.34 volts 2-stage pump (tripler) 10.71 volts 3-stage pump (quadrupler) 13.81 volts However, the circuits of FIGS. 3 and 4 generate unregulated voltages. The voltages generated by these circuits can vary considerably with both integrated circuit process variations and operating conditions. Regarding process variations, the manufacturing conditions week to week or from manufacturer to manufacturer produce variation from chip to chip. Fast silicon (with smaller diode drops) may cause a voltage tripler to generate too high a voltage, for example. Regarding variation in operating conditions, high temperature causes variations in voltage drop and on-resistance, and power supply voltage may vary from day to day or from site to site, producing corresponding variation in voltage generated by an unregulated voltage pump.

Because of these variations, a voltage doubler may generate insufficient voltage to achieve the desired benefits of the voltage pump, and a voltage tripler may generate a voltage which exceeds the transistor breakdown voltage. Thus, a voltage generator having a more reliable output voltage is needed.

SUMMARY OF THE INVENTION

According to the invention, a regulated voltage pump is provided which uses elements of the prior art voltage pumps described above but which uses feedback from the output signal to determine how many stages to pump. A comparator compares a signal related to the output signal to a reference voltage (which may be the power supply voltage) and controls how many pumping capacitors receive a switching clock signal.

Two embodiments are disclosed. A first embodiment uses a comparator output to control a logic gate which receives a switching signal. The comparator output determines whether the logic gate output is a steady state signal or a switching signal. The logic gate output supplies voltage to capacitive stages which selectively pump the output voltage when the regulated voltage is too low. In this embodiment, the voltage can be pumped to a wide range of regulated levels by selecting the reference voltage supplied to the comparator, by selecting how many stages are pumped, and by selecting which stage drives the comparator. In a second embodiment a switching voltage to one comparator input causes the comparator output to switch or not switch depending upon whether the switching input crosses the reference voltage on the other comparator input. The comparator output, which is preferably buffered, feeds capacitor plates which are selectively pumped depending upon the level of the output voltage.

As another feature of the invention, a capacitor is formed in three adjacent conductive layers of a semiconductor integrated circuit chip. A first plate of the capacitor is formed in the middle layer. A second plate is formed in the upper and lower layers plus a small portion of the middle layer which interconnects the upper and lower layers and forms a U-shaped structure surrounding the first plate. These capacitors are preferably formed in pairs with the first plates interconnected. The second plates may be connected to different voltage supplies to form a capacitive voltage divider.

BRIEF DESCRIPTION OF THE DRAWINGS

FIGS. 1 and 2 show logic circuits which can benefit from the regulated pump circuit of the present invention.

DETAILED DESCRIPTION OF SOME PREFERRED EMBODIMENTS

Figure 5:
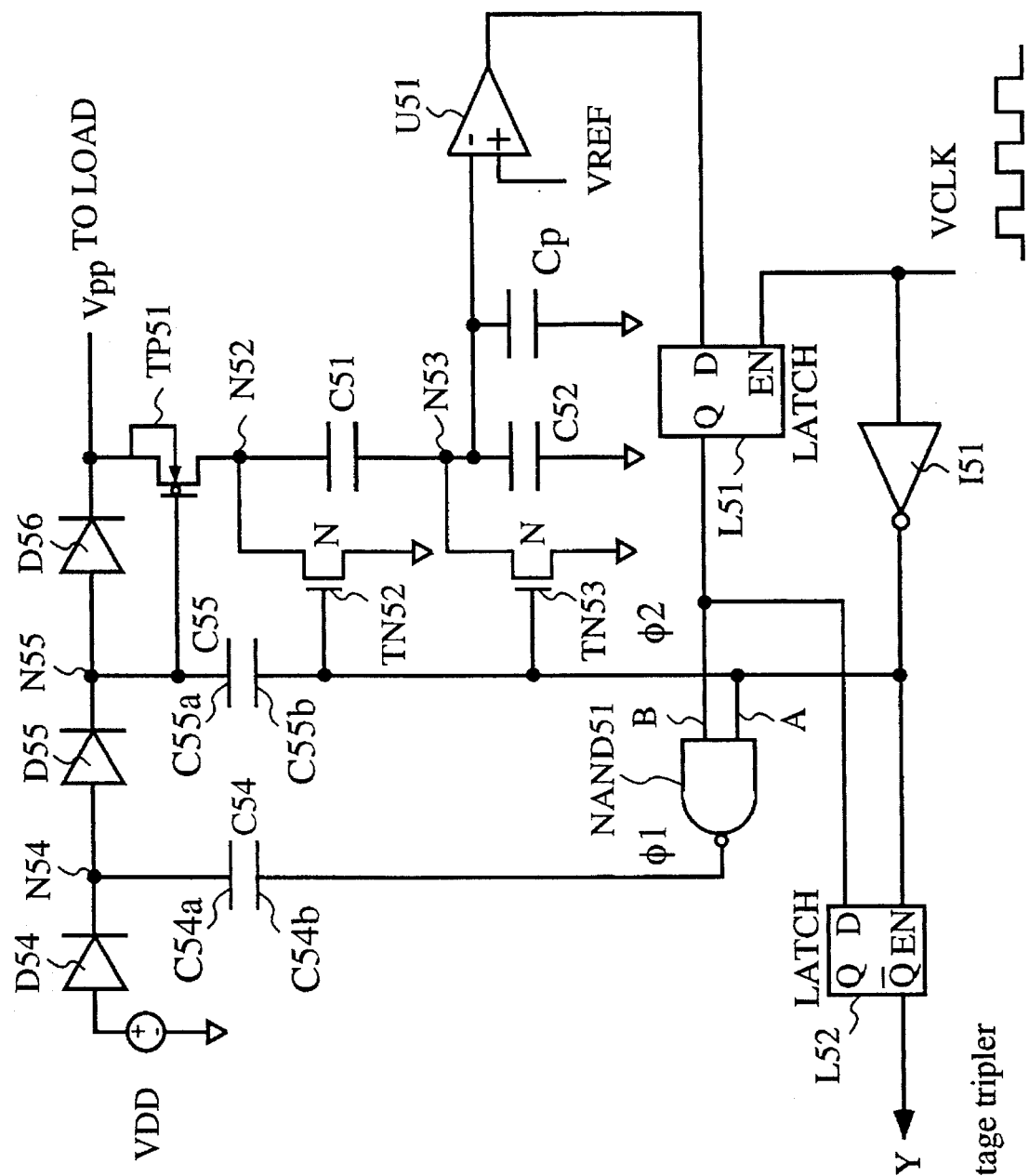
FIG. 5 shows a regulated voltage pump circuit according to the present invention.

As shown in FIG. 5, a supply voltage Vdd is applied to the anode of diode D54, which is connected at its cathode (node N54) to plate C54a of capacitor C54 and to the anode of diode D55. Diode D55 is connected at its cathode (node N55) to plate C55a of capacitor C55 and to the anode of diode D56. The cathode of diode D56 provides the output signal Vpp. The voltage on plate C55a of capacitor C55 is pumped by the voltage applied to plate C55b by inverted clock signal VCLK.

Figure 3:
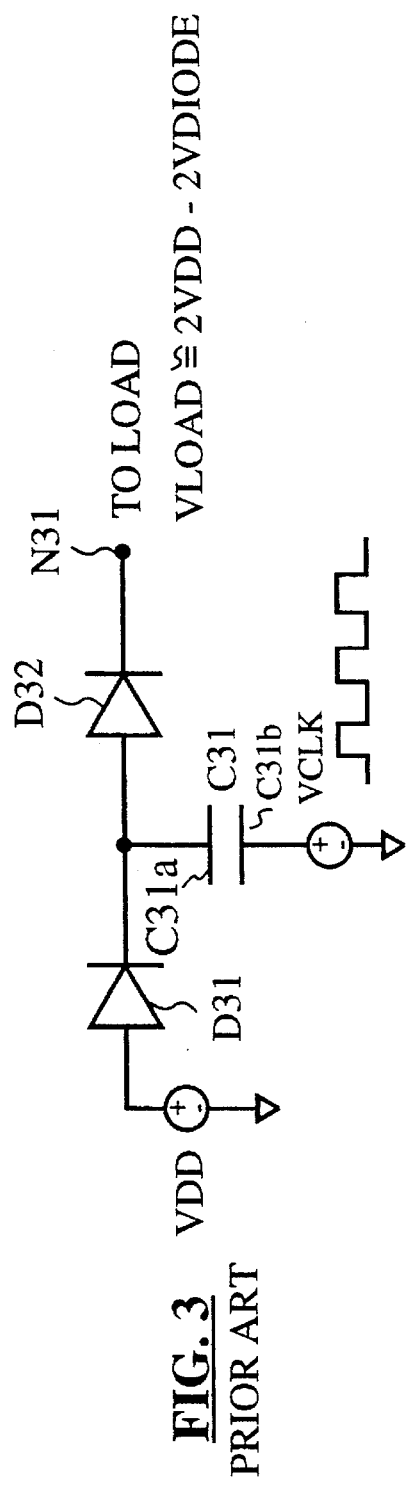
FIGS. 3 and 4 show prior art unregulated voltage pump circuits.
Figure 4:
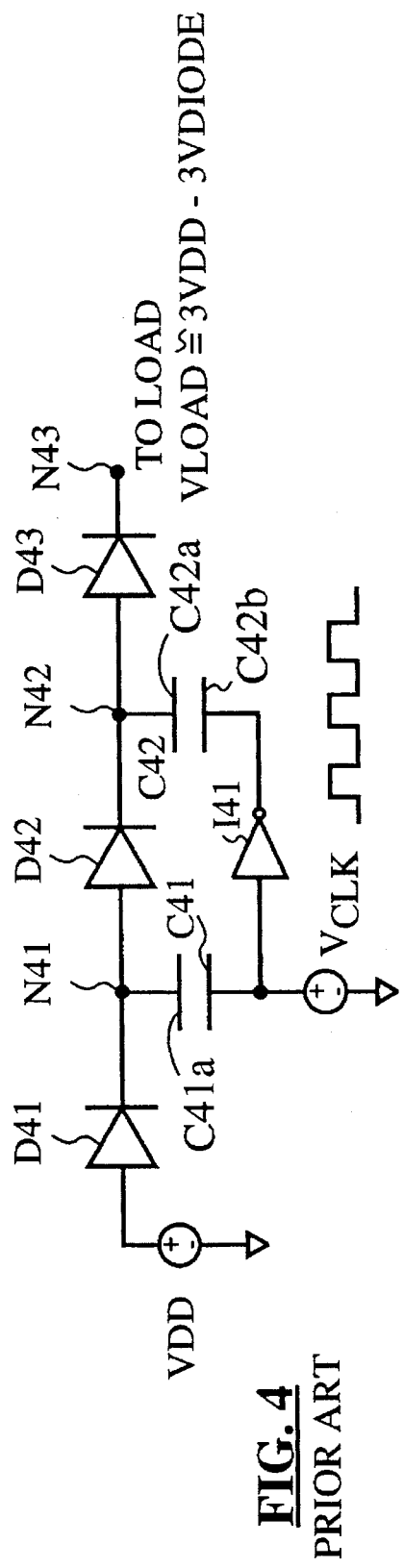

In contrast to prior art FIG. 4, the signal applied to plate C54b of capacitor C54 may be pumped or not pumped as determined by feedback from load output signal Vpp. Comparator U51 provides a logic high output signal when the voltage on its inverting input terminal is lower than a reference voltage VREF and a logic low otherwise. This comparator output signal is passed by latch L51 to its Q output terminal when its enable terminal encounters a logic high VCLK signal.

Because of inverter I51, a low signal is provided to input terminal A of NAND gate NAND51 when latch L51 is enabled and a high signal is provided when latch L51 is disabled. Thus a high Q output signal from latch L51 causes NAND gate NAND51 to pass the VCLK signal to capacitor C54, which in turn results in a pumped voltage at node N54, resulting in a higher voltage to node N55 than if capacitor C54 is not pumping. The peak voltage at node N55 is Vdd+2VCLK−VD54−VD55 when capacitor C54 is pumping. If the output of comparator U51 is a logic low, NAND gate NAND51 will provide a steady high signal to plate C54b, causing the peak voltage on node N55 to decrease toward Vdd+VCLK−VD54−VD55. This decrease allows a corresponding decrease at Vpp.

A switched capacitive voltage divider is provided between Vpp and the inverting input to comparator U51, comprising P-channel transistor TP51, capacitors C51 and C52 (along with comparator parasitic capacitance Cp) and N-channel transistors TN52 and TN53. P-channel transistor TP51, which operates in a higher voltage range has its well isolated and biased to the highest terminal voltage, which is the source voltage at Vpp. The gate of P-channel transistor TP51 is connected at node N55 to plate C55a of capacitor C55 at node N55, and receives the switching clock signal provided by VCLK through inverter I51 to plate C55b of capacitor C55. Thus transistor TP51 turns on any time node N55 is lower by more than a threshold drop than output voltage Vpp. Transistors TP51, TN52 and TN53 turn off at appropriate voltages so that no DC current path exists from Vpp to ground. When P-channel transistor TP51 is off, N-channel transistors TN52 and TN53 are on, and discharge their respective nodes N52 and N53 to ground voltage. During the other approximately half cycle, transistors TN52 and TN53 are off, and transistor TP51 is on, applying Vpp to node N52. If capacitor C51 is equal to capacitors C52+Cp, node N53 rises to half the voltage of node N52. During the half cycle transistor TP51 is on, the formula for voltage at node N53 is $$V_{N53} = Vpp \ (C51)/(C51+C52+Cp)$$

where $V_{N53}$ is voltage at node N53

Vpp is voltage at the output node

C52 is capacitance of capacitor C52

C51 is capacitance of capacitor C51, and

Cp is parasitic capacitance of comparator U51, transistor TN53, and other effects of layout Also provided in the circuit of FIG. 5 is latch L52, whose output indicates that Vpp has reached the desired value. Latch L52 can be used to terminate a reset state which occurs at power-up. The $\overline{Q}$ output signal from latch L52, labeled READY, is held low until both the enable port EN of latch L52 is enabled by a high inverted clock signal (low VCLK) and a low signal is applied to the D input of latch L52 by the Q output of latch L51. This low Q output signal from L51, in turn, occurs only after the Vpp voltage has risen to its required level, thereby causing a low output signal from comparator U1.

Figure 6:
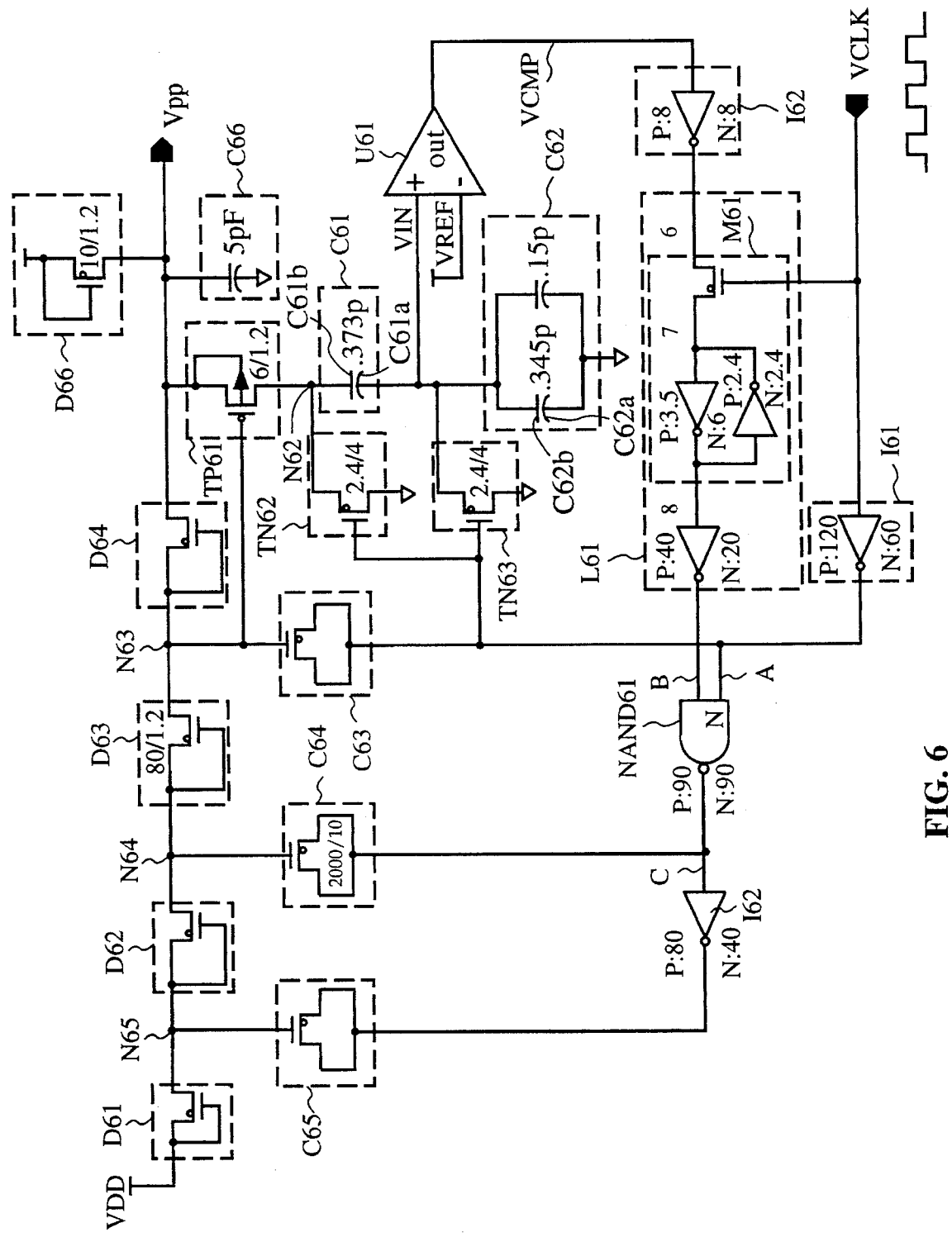
FIG. 6 shows another regulated voltage pump circuit according to the invention.
Figure 7:
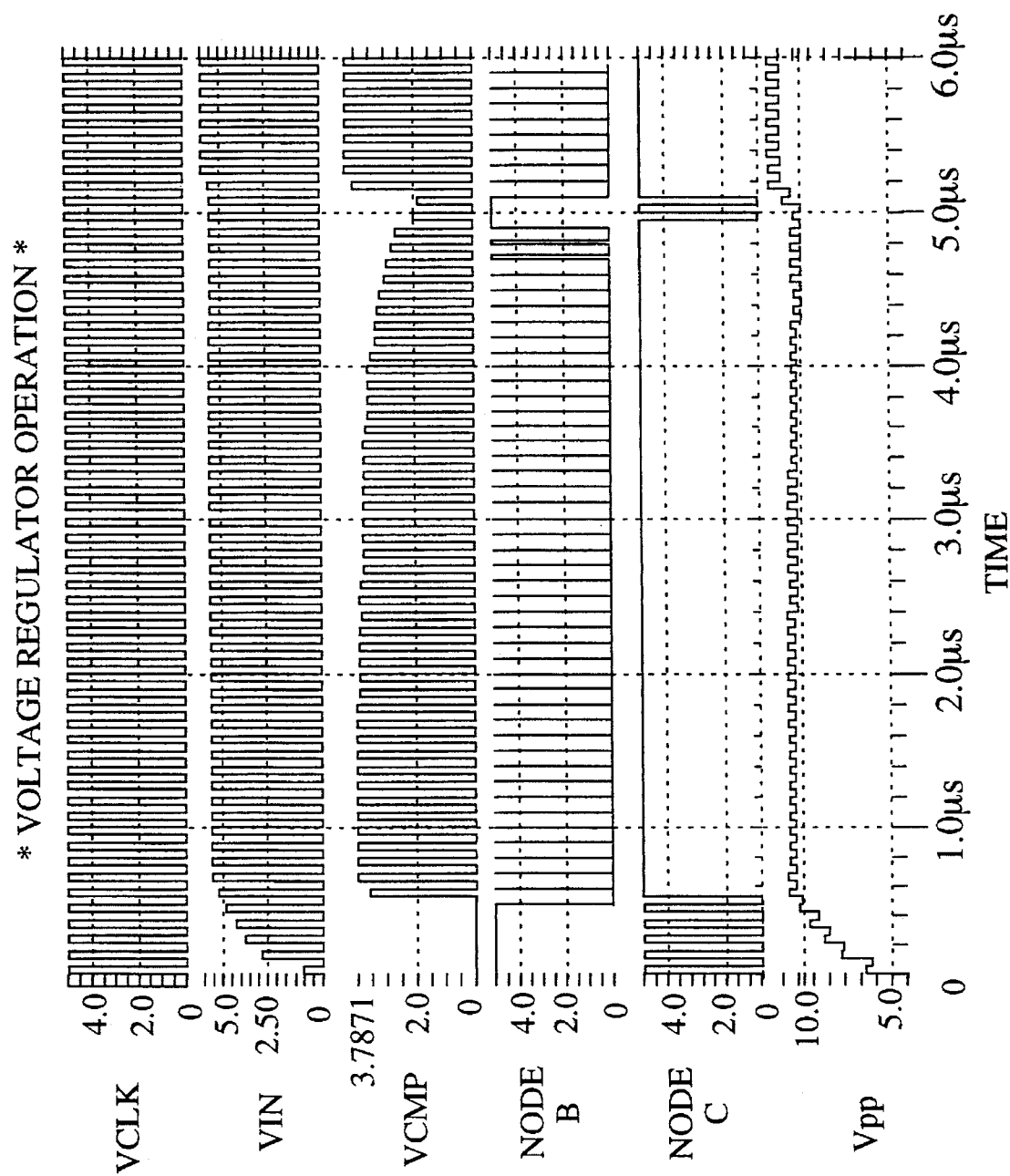
FIG. 7 shows a timing diagram for the circuit of FIG. 6.
Figure 8A:
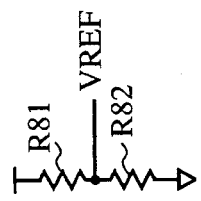
FIG. 8 shows a simpler regulated voltage pump circuit according to the invention.
Figure 8:
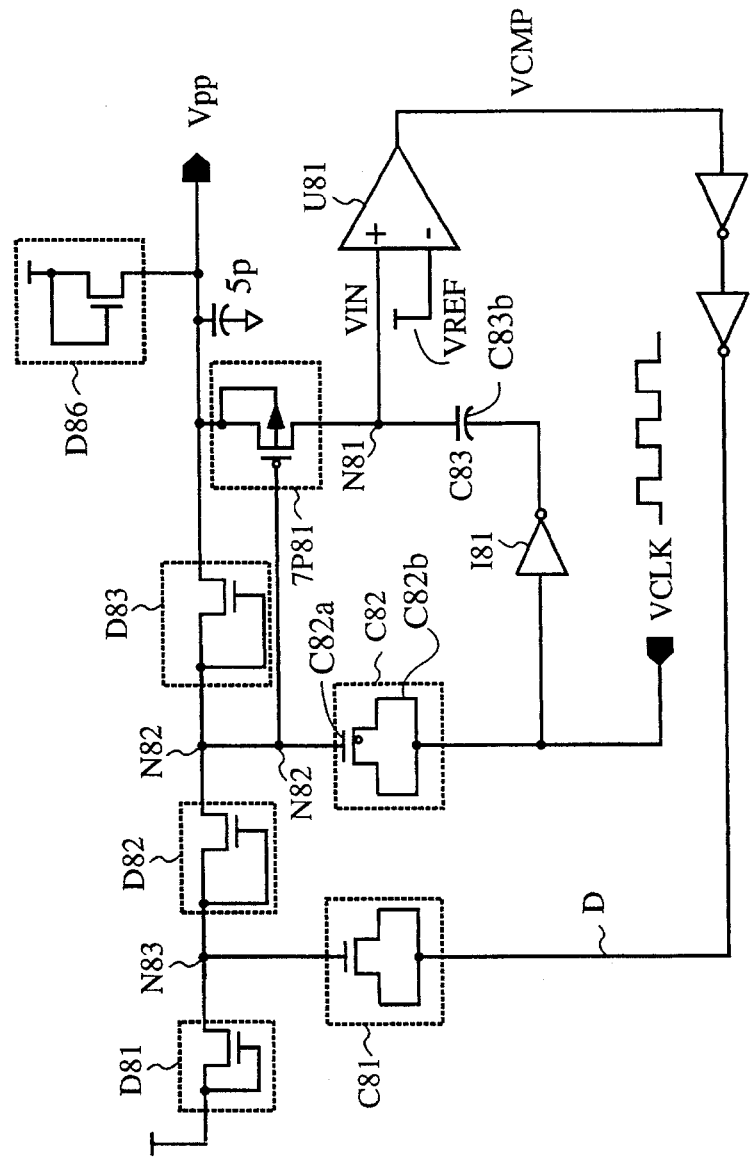
Figure 9:
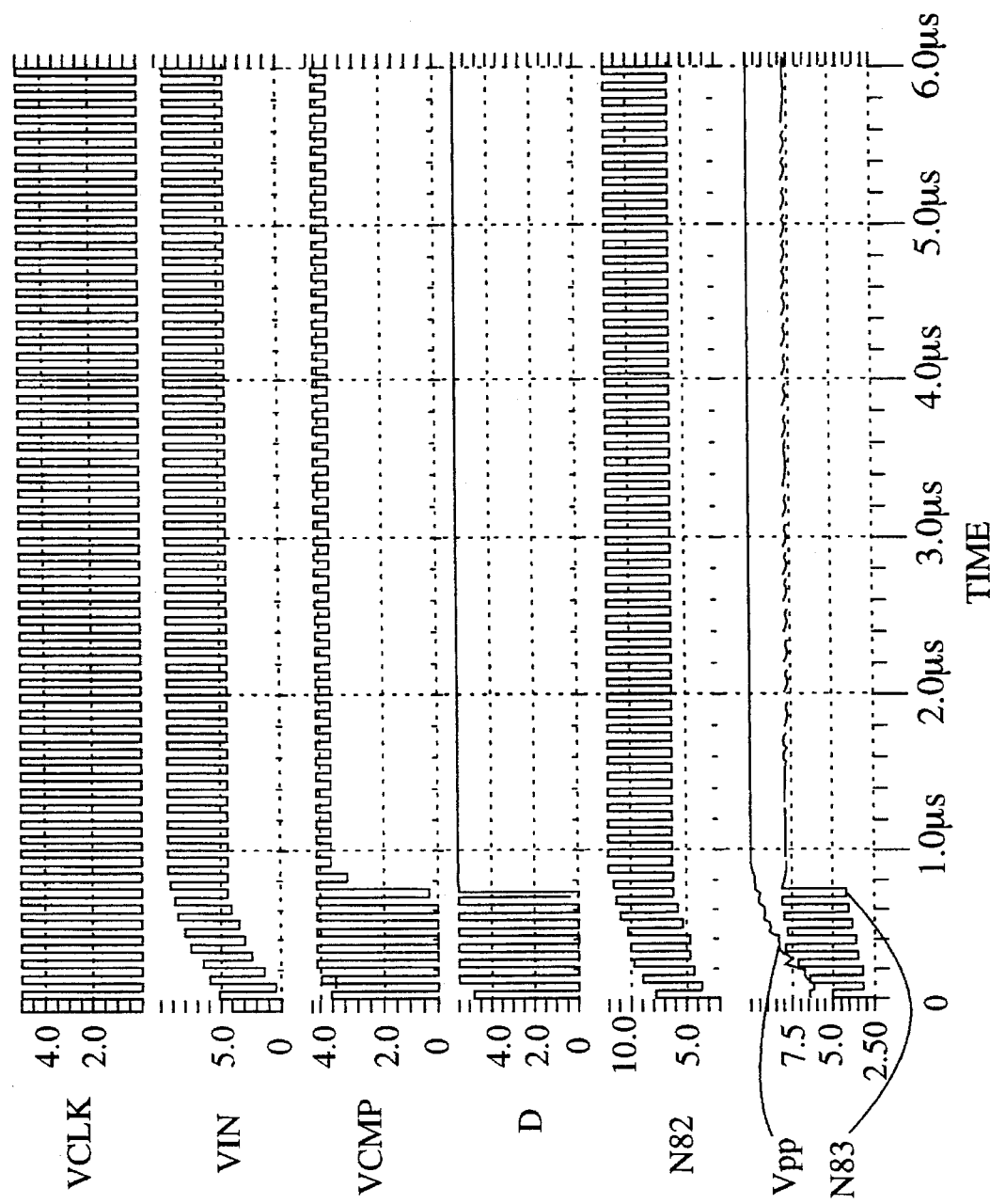
FIG. 9 shows a timing diagram for the circuit of FIG. 8.

Operation of the present invention can be better understood by reviewing the circuit embodiments of FIGS. 6 and 8 in conjunction with their timing diagrams shown in FIGS. 7 and 9, respectively.

FIG. 6 shows a voltage pump of the present invention which uses four diodes D61 through D64 in series, and controls the pumping between two pairs of the diodes D61 to D62 and D62 to D63. The diodes are formed as enhancement mode N-channel MOS transistors with the anode formed by connecting the drain of the transistor to the gate. In one embodiment which uses a 10 MHz clock frequency, long channel devices (length approximately 1.35 microns and width 80 microns) allow sufficient charge to bleed through at every clock cycle. Because the pump diodes can have higher voltages than the Vpp output voltage, these pump diodes are manufactured to have higher breakdown voltages than other diodes and other transistors. This higher breakdown is achieved by creating the diode transistors as annular devices each having a lightly doped drain, with the drain completely surrounded by the gate but never touching the field oxide or field implant, and the gate completely surrounded by the source. Since the drain junction is completely surrounded by a lightly doped channel, the junction breakdown is significantly higher than if the drain were to border a more heavily doped field region.

Capacitors C65, C64, and C63, which pump nodes N65, N64, and N63 between diodes D61, D62, D63, and D64 respectively, are formed as enhancement mode NMOS transistors in which the oscillating capacitor plate is formed by connecting source and drain of the transistor, and the opposite capacitor plate is formed as the transistor gate.

NAND gate NAND61 is equivalent to NAND gate NAND51 of FIG. 5. Comparator U61 and inverter I62 are equivalent to comparator U51 of FIG. 5. Latch L61 is formed from a 5-transistor memory cell M61 (such as described by Hung-Cheng Hsieh in U.S. Pat. No. 4,750,155, the specification of which is incorporated herein by reference) with an inverter at its output. Capacitors C61 and C62 form a capacitive voltage divider, with output VIN divided from Vpp and provided at the intermediate node. The capacitors are preferably formed in a sandwich of conductive layers above the semiconductive substrate. The intermediate node at which VIN is generated is formed in first layer metal above a layer of polycrystalline silicon and beneath a second layer of metal. To minimize parasitic interconnect capacitance, the length of any metal connecting to the first metal node VIN is minimized. If Vpp should be twice VREF, the capacitance (size) of capacitor C61 is made slightly larger than the capacitance of capacitor C62 in order to take into account the parasitic capacitance between VIN and ground.

Sandwich Capacitors

Figure 10:
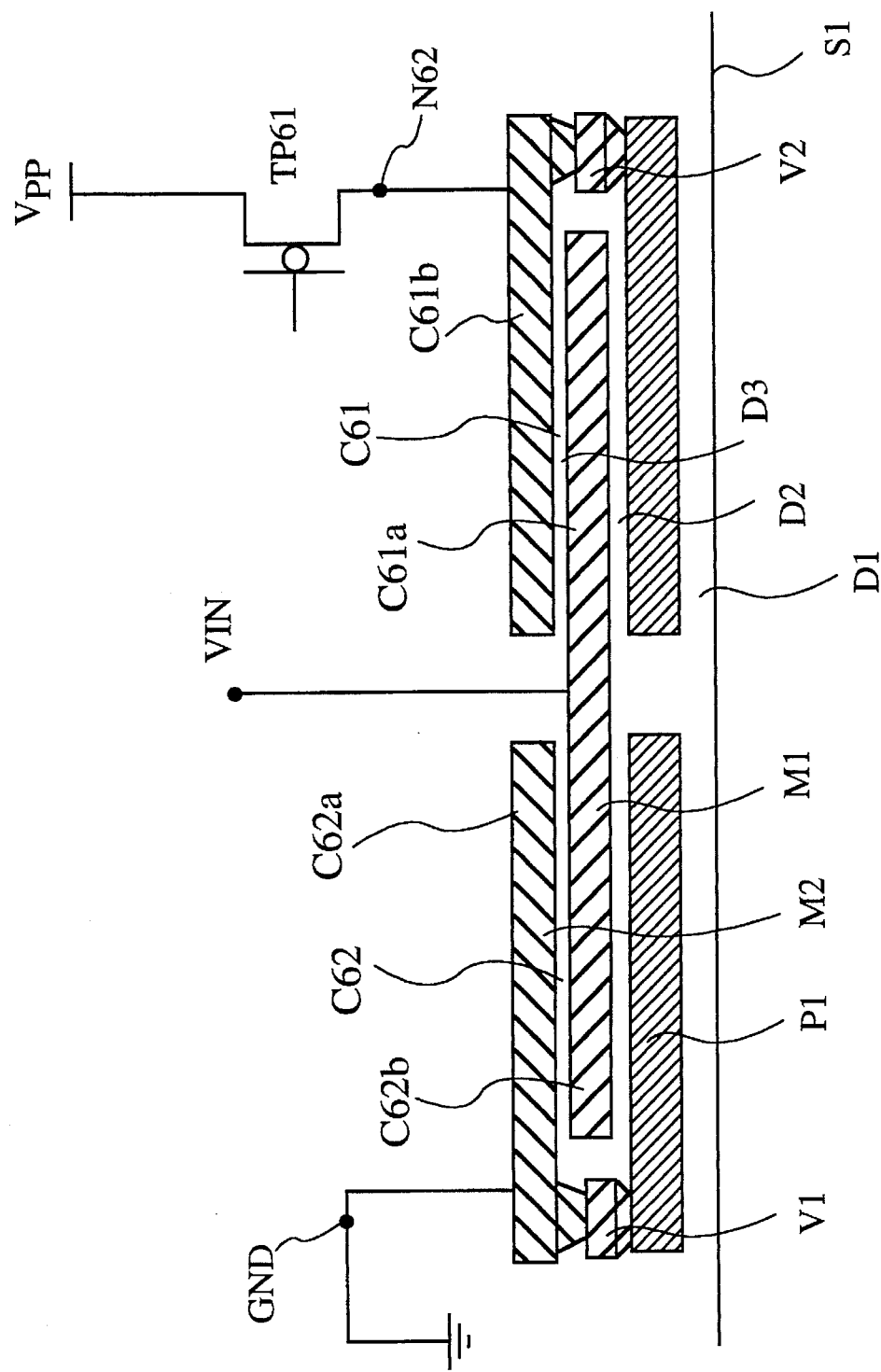
FIG. 10 shows a three-layer capacitor pair preferably used with the invention.

In a preferred embodiment, capacitors C61 and C62 of FIG. 6 are formed in the sandwich arrangement shown in FIG. 10. Numerals in the upper portion of FIG. 10 corresponds to numerals in FIG. 6.

The capacitor arrangement of the invention may be used whenever the process technology includes three or more conductive layers. It is most beneficial when two capacitors share a common node, as is the case with capacitors C61 and C62 attached to common node N63. However, a single capacitor can also be formed according to the invention, either by forming the left or right half of FIG. 10 or by interconnecting both plates of the two capacitors shown.

The material in which the capacitors are formed comprises a six-layer structure above a semiconductive substrate S1. In order, the layers are dielectric layer D1, conductive polycrystalline silicon layer P1, dielectric layer D2, conductive metal layer M1, dielectric layer D3, and conductive metal layer M2.

In laying out capacitors C61 and C62 of FIG. 6, as shown in FIG. 10, plates C61a and C62b of capacitors C61 and C62 are formed as a single piece. Common node VIN and plates C61a and C62b are formed in metal 1. The other capacitor plates C61b and C62a are formed as a sandwich surrounding the common node. As shown in FIG. 10, each of plates C61b and C62a is formed partly in polycrystalline silicon layer P1 and partly in metal 2 above metal 1. The upper and lower portions of capacitor plate C62a are connected through via connection V1 which comprises a piece of metal 1 laterally spaced and insulated from the metal 1 capacitor plate C62b. Connection V1 extends downward through a via opening in the D2 dielectric layer, and contacts the lower portion of capacitor plate C62a. Another via in dielectric layer D3 allows the upper portion of plate C62a to contact via connection V1. Thus the upper metal 2 and lower metal 1 portions of capacitor plate C62a are connected to each other through via connection V1. This configuration achieves nearly double the capacitance per unit area of a capacitor formed in only two conductive layers. This benefit exists with capacitors C61 and C62. Doubling of capacitance per unit area occurs for each capacitor.

As a further advantage of the invention, the process parameters for the two capacitors will be very similar since the capacitors are very close to each other, and are formed in the same combination of layers. Therefore the ratio of the capacitance can be well controlled. Control of the relative capacitance is further well controlled because any stray capacitance which results from further metal lines passing nearby in metal 3, if it exists, will not affect the voltage at the common node VIN. More commonly, in a process using only two metal and one polycrystalline silicon layer, the formation of the two capacitors C61 and C62 in the three conductive layers prevents other conductive lines from being laid out above the structure, and thereby prevents or greatly reduces any stray capacitance.

In the embodiment of FIG. 6, if capacitor C61 is of value equal to capacitor C62 plus parasitic capacitance, Vpp will be twice VIN. Comparator U61 compares VIN to VREF. Thus Vpp will be twice VREF.

Initial Power-Up

Also included in the circuit of FIG. 6 is a diode-connected transistor D66. This transistor provides a source of power to circuitry which is supplied by the Vpp signal. The circuitry is represented in FIG. 6 by capacitor C66, but may actually comprise an extensive logic circuit of many components. The capacitance of C66 is shown as 5 pF, but may be orders of magnitude higher in some applications. It is preferred in some applications that circuitry which will be powered by Vpp be initially powered through a large transistor D66, which can provide the supply voltage and can source higher current than the regulated circuit of FIG. 6.

Timing Diagram for Pump

FIG. 7 shows a timing diagram for the circuit of FIG. 6. The capacitive loading is represented by capacitor C66 as very small, 5 pF. This value was chosen for the simulation represented in FIG. 7, so the operation of the circuit could be easily demonstrated by showing a small number of clock cycles. When the circuit turns on and the VCLK signal begins cycling, the noninverting input VIN to comparator U61 begins to cycle also, taking a few cycles (approximately 0.5 microseconds for the embodiment shown) to rise to its steady state value as Vpp begins to rise. Comparator U61 output signal VCMP is initially low while VIN is below VREF. During this time, input node B of NAND gate NAND61 remains high as driven by latch L61. Latch L61 carries a high signal during this time because it presents the high output signal from inverter I62, which inverts the low output signal VCMP.

While node B is high, the output at node C from NAND gate NAND61 switches in response to the inverted clock signal at node A. This switching signal at node C pumps the voltage at both nodes N65 an N64. The three pumped nodes N65, N64 and N63 cause a fast rise in the output voltage Vpp.

As shown in FIG. 7, after a period of about 4.5 microseconds, Vpp decreases to below 10 volts, which causes the voltage to be pumped higher. In the embodiment of FIG. 6, if capacitor C61 and capacitor C62 plus parasitics are of equal value, Vpp will be twice VREF. VREF is 5 volts. Therefore the pumping is initiated when Vpp goes below 10 volts, or VIN goes below 5 volts. Another value of VREF would in turn produce another value of Vpp. Another ratio of capacitors C61 and C62 would also produce a different value of Vpp. Capacitor C62 is shown as comprising two parallel capacitors, one of which results from the parasitic capacitance in the layout. In general, the relationship is $$Vpp=VREF*(C61+C62+Cp)/C61$$

where Cp is the parasitic capacitance associated with comparator U61, transistor TN63, and the layout arrangement of conductive lines.

In the present case, when Vpp decreases below 10 volts, VIN decreases below 5 volts. VCMP, which amplifies the variation in VIN decreases in this embodiment below 2.0 volts, which is the trigger point of inverter I62. Thus inverter I62 begins to generate a logical 1 output signal, which on the next cycle of VCLK causes latch L61 to generate a high output signal at node B. This high output signal on node B (which occurs at about 4.9 microseconds in FIG. 7) causes node C to again carry the (inverted) switching VCLK signal, again increasing the pumping of Vpp. Thus the Vpp output signal is maintained within a narrow range of the intended voltage.

The particular load attached to Vpp to generate the timing diagram of FIG. 7 allows the voltage to be pumped sufficiently in only two clock cycles. A larger load at Vpp would cause the voltage at Vpp to decrease faster and would require a somewhat longer pumping signal at node C to restore the voltage at Vpp. The size of the regulator capacitors and any parasitic capacitance also affects the pumping time.

FIG. 8 shows a simplified voltage pump with regulation, again operating on the same principle of a comparator controlling the degree of pumping in a diode-capacitor voltage pump. In the circuit of FIG. 8, VCLK provides a switching clock signal to capacitor C82, which causes the voltage at node N82 to cycle. Inverter I81 pulls down plate C83b of capacitor C83 at the time VCLK is causing plate C82a of capacitor C82 to source current, causing the voltage on node N82 to go higher and to source current through diode D83 to Vpp.

Upon power-up, diode D86 sources current to Vpp; thus in a system in which Vdd is 5 volts, Vpp is initially at 5 volts minus the threshold drop of D86. Node N82 is initially 5 volts minus the threshold drops of D81 and D82. When the VCLK signal begins to oscillate, node N82 oscillates upward from its initial value by an amount close to the voltage change in VCLK. Node N81 oscillates in the opposite phase. This oscillation means that transistor TP81 continuously switches between on and off. When node N81 is oscillating between a voltage level above VREF and a voltage level below VREF, the switching VCMP voltage generates a switching voltage level at node D, which pumps node N83. The pumped voltage at node N83 causes a corresponding increase in the voltage at Vpp, as discussed above with the embodiment of FIG. 6.

FIG. 9 shows the above situation at the left portion of the figure, for about the first microsecond after power-up. As the voltage on Vpp rises toward Vdd+VREF (Vdd is the power supply voltage supplied to VCLK), the minimum VIN voltage rises sufficiently that VCMP ceases switching and D ceases switching. The minimum VIN voltage is determined by the charge left on capacitor C83. When transistor TP81 is on, VIN rises to Vpp. Concurrently, plate C83b is at Vdd as determined by the inversion of VCLK. Therefore, capacitor C83 has a voltage drop of Vpp–Vdd when transistor TP81 is on. When TP81 turns off, the voltage drop across C83 does not change, but plate C83b has returned to ground (0 volts). As a result, VIN drops from Vpp to Vpp–Vdd. When Vpp reaches 2Vdd, the lowest voltage seen at Vin is:

$$Vpp-Vdd=2Vdd-Vdd=Vdd$$

If Vref=Vdd, the comparator stops switching when Vpp= 2Vdd, and Vpp will not rise above 2Vdd. This causes capacitor C81 to cease pumping node N83, and the pumping of Vpp is from capacitor C82 and node N82 only. In the example of FIG. 8, the load is very small, so the pumped Vpp voltage remains high for a time longer than shown in the graph. When Vpp goes sufficiently low that VIN again causes VCMP to switch, node D will again cause capacitor C81 to pump node N83 and increase the voltage on Vpp. Thus the circuit of FIG. 8 provides a regulated voltage equal to Vdd+VREF.

If VREF is Vdd, the circuit of FIG. 8 is a regulated voltage doubler. As shown in FIG. 8a, the value of VREF can easily be made lower than Vdd using a voltage divider connected between VDD and ground, the relative values of the voltage divider resistors R81 and R82 determining the value of VREF. Thus a voltage less than 2Vdd can easily be generated using the circuit of FIG. 8.

In light of the above description, other embodiments of the present invention will become obvious to those skilled in the art. Embodiments made using fuses rather than antifuses are included, for example, and both fuses and antifuses are included in the term "fuse" means. Such embodiments are intended to fall within the scope of the claims.

We claim:

1. A voltage regulator comprising:
   a plurality of capacitors for pumping a supply voltage through a plurality of stages, each capacitor pumping one of said stages, said plurality of capacitors thereby generating an output voltage;
   a plurality of diodes connected in series, a first diode of said plurality receiving said supply voltage and a last diode of said plurality providing said output voltage; and
   a comparator for receiving said output voltage, wherein said comparator controls the pumping of at least one of said plurality of capacitors and at least one of said plurality of capacitors is pumped independently from said comparator.

2. A voltage regulator as in claim 1 in which said comparator causes said plurality of capacitors to pump said output voltage toward a first higher voltage when said output voltage is below a selected level, and said comparator causes said plurality of capacitors to pump said output voltage toward a second lower voltage when said output voltage is above said selected level.

3. A voltage regulator as in claim 2 wherein each capacitor has a first plate connected to a node between a corresponding pair of said diodes; and
   means for applying switching signals to a second plate of each capacitor, wherein said switching signals are inverted for each successive capacitor.

4. A voltage regulator as in claim 3 wherein said plurality of diodes comprises first, second, third, and fourth diodes, said fourth diode supplying said output voltage,
   wherein said plurality of capacitors comprises first, second, and third capacitors, said first capacitor having its first plate connected to a node between said first and second diodes, said second capacitor having its first plate connected to a node between said second and third diodes, said third capacitor having its first plate connected to a node between said third and fourth diodes, and
   wherein said means for applying switching signals comprises a clock signal source connected to said third capacitor, and said clock signal source is connected through said comparator for controlling pumping to said first and second capacitors.

5. A voltage regulator as in claim 3 wherein said comparator has a first input port, a second input port, and an output port, wherein said first input port receives a reference voltage and said second port receives a signal related to said output voltage.

6. A voltage regulator as in claim 1 further including:
   a transistor having a first terminal connected to receive said output voltage and a second terminal coupled to a first input node of said comparator,
   wherein said comparator has a second input node connected to receive a reference voltage, and an output node coupled to the plate of said at least one capacitor; and
   means for pumping voltage at said second terminal to a high level while said transistor is turned off and to a low level while said transistor is turned on.

7. A voltage regulator coupled to a voltage supply and providing an output voltage, said voltage regulator comprising:
   a plurality of capacitors for pumping said supply voltage through a plurality of stages, each capacitor pumping one of said stages; and
   a feedback system coupled between an output line providing said output voltage and said plurality of capacitors, wherein said system includes:
      a comparator having a first input port, a second input port, and an output port, wherein said first input port receives a reference voltage and said second input port receives a modified signal, said modified signal being related to said output voltage; and
   control means connected to said output port of said comparator for determining the signals provided to said plurality of capacitors, wherein said control means comprises:
      a NAND gate having a first terminal, a second input terminal, and an output terminal;
      a first inverter which receives a clock signal and provides a signal to said first input terminal of said NAND gate; and
      a latch having an input terminal, an enable terminal, and an output terminal, wherein said input terminal of said latch is coupled to said output port of said comparator, and said output terminal of said latch is coupled to said second input terminal of said NAND gate, wherein said enable terminal receives said clock signal.

8. A voltage regulator coupled to a voltage supply and providing an output voltage, said voltage regulator comprising:
   plurality of capacitors for pumping said supply voltage through a plurality of stages, each capacitor pumping one of said stages; and
   a feedback system coupled between an output line providing said output voltage and said plurality of capacitors, wherein said feedback system includes:
      a comparator having a first input port, a second input port, and an output port, wherein said first input port receives a reference voltage;
      control means coupled to said output port of said comparator for determining the signals provided to said plurality of capacitors; and
      means for generating a modified signal coupled between said output line and said second input port, said means for generating comprising:
         a P-channel transistor having a first terminal, a second terminal, and a gate, said first terminal connected to said output line, and said gate connected to an anode of said last diode;
         a pair of capacitors connected in series between said second terminal of said P-channel transistor and a first voltage source; and
         means for discharging said pair of capacitors if said P-channel transistor is off, and not discharging said pair of capacitors if said P-channel transistor is on.

9. The voltage regulator of claim 7 further including a second inverter coupled between said output terminal of said NAND gate and at least one of said plurality of capacitors.

* * * * *

UNITED STATES PATENT AND TRADEMARK OFFICE
CERTIFICATE OF CORRECTION

PATENT NO. : 5,574,634
DATED : November 12, 1996
INVENTOR(S) : David B. Parlour and Roger D. Carpenter It is certified that error appears in the above-identified patent and that said Letters Patent is hereby corrected as shown below:

Col. 5, line 6, "$V_{NS3}$" should read --$V_{N53}$--.

Signed and Sealed this

Third Day of February, 1998

Attest:

BRUCE LEHMAN

Attesting Officer

Commissioner of Patents and Trademarks